United States Patent Office 3,787,443
Patented Jan. 22, 1974

3,787,443
ARYLOXY EPITHIO ETHERS
Donald W. Erickson, Cupertino, Calif., assignor to Zoecon Corporation, Palo Alto, Calif.
No Drawing. Filed Feb. 25, 1971, Ser. No. 119,042
Int. Cl. C07d 1/18, 59/00
U.S. Cl. 260—327 E                      10 Claims

ABSTRACT OF THE DISCLOSURE

Novel phenyl ethers, phenyl thioethers and derivatives thereof having a side chain of six to twelve carbon atoms with lower alkyl substituent at C-2 and C-5 or C-3 and C-6 which is saturated, mono-unsaturated or substituted with oxido, epithio or halo useful for insect control.

This invention relates to novel phenyl ethers, phenyl thioethers and derivatives thereof of the following Formula I:

$$R^3-\underset{\underset{Z}{|}}{\overset{\overset{R^2}{|}}{C}}-CH-CH_2-\underset{\underset{Z'}{|}}{\overset{\overset{R^1}{|}}{C}}H(CH_2)_n-W-R \qquad (I)$$

wherein, $n$ is the positive integer one or two;
$Z'$ is hydrogen;
$Z$ is hydrogen, bromo, chloro, fluoro, or, taken together with $Z'$, a carbon-carbon bond, oxido or epithio;
W is oxygen atom, sulfur atom, sulfinyl or sulfonyl;
each of $R^1$, $R^2$ and $R^3$ is lower alkyl;
R is one of the groups

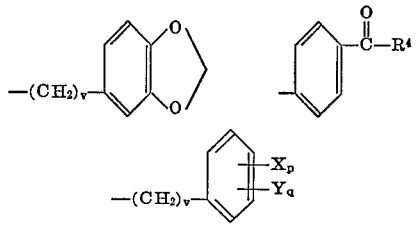

in which $v$ is zero or the positive integer one; $R^4$ is hydrogen, lower alkyl, cycloalkyl, aralkyl or lower alkoxy; X is halo, Y is lower alkyl, lower alkenyl, lower alkoxy, nitro, cyano, halomethyl, dihalomethyl, trihalomethyl, lower alkylthio, lower alkylsulfinyl or lower alkylsulfonyl; $p$ is zero or a positive integer of one to five; and $q$ is zero or a positive integer of one to three, the sum of $p$ and $q$ being from one to five.

The novel compounds of Formula I are useful for the control of insects. The utility of these compounds as insect control agents is believed to be attributable to their juvenile hormone activity. They are preferably applied to the immature insect, namely—during the embryo, larvae or pupae stage in view of their ability to effect metamorphosis and otherwise cause abnormal development. These compounds are effective control agents for Hemipteran such as Lygaeidae, Miridae and Pyrrhocoridae; Coleopteran such as Tenebrionidae; Lepidopteran such as Pyralidae, Noctuidae and Gelechiidae; Dipteran such as mosquitoes; Orthoptera such as roaches; and Homoptera such as aphids. The compounds may be applied at low dosage levels of the order of 0.001 μg. to 25 μg. per insect. Suitable carrier substances include liquid or solid carriers, such as water, mineral or vegetable oils, talc, silica and natural or synthetic resin. The control of insects in accordance with the present invention is accomplished by spraying, dusting or exposing the insects to the vapor of the novel compounds. Generally, a concentration of less than 75% of the active compound is employed. The formulation can include insect attractants, emulsifying agents and wetting agents to assist in the application and efficiency of the active ingredient.

In the description hereinafter, each of R–R⁴, W, $v$, $n$, Z, Z', X and Y is as defined hereinabove.

The compounds of the present invention are prepared by alkylation of a phenyl alcohol or phenyl thiol of the Formula II, III or IV:

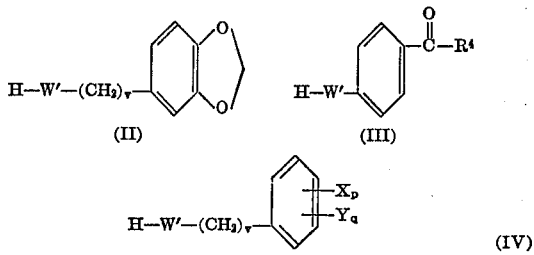

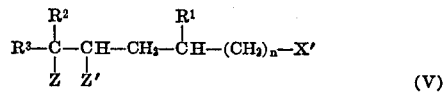

with a bromide or chloride of Formula V:

$$R^3-\underset{\underset{Z}{|}}{\overset{\overset{R^2}{|}}{C}}-CH-CH_2-\underset{\underset{Z'}{|}}{\overset{\overset{R^1}{|}}{C}}H-(CH_2)_n-X' \qquad (V)$$

wherein W' is oxygen atom or sulfur atom and X' is bromo, chloro, or iodo. The alkylation is carried out in an organic solvent such as dimethylformamide, ether, tetrahydrofuran or dimethyllacetamide, in the presence of a base such as sodium hydride, sodium carbonate, potassium carbonate, and the like.

The sulfinyl compounds (W is SO) are prepared by treatment of a thioether with sodium metaperiodate, hydrogen peroxide, or the like, at a temperature of from about 0° to 20° C. for about one to six hours. The reaction usually affords some of the sulfonyl compound also which can be separated by chromatography. By using more than one mole of sodium periodate or hydrogen peroxide, higher temperature and longer reaction time, the reaction favors formation of the sulfonyl compounds. Preparation of sulfinyl and sulfonyl compounds is described by N. J. Leonard et al., Journal of Organic Chemistry, 27, 282 (1962).

In the case where Z is bromo, chloro, fluoro or, taken together with Z', oxido or epithio, those functional groups can be introduced before or after the alkylation step is carried out. To prepare compounds of the present invention wherein Z is bromo, chloro or fluoro, the mono-unsaturated precursor is treated with about one equivalent of dry hydrogen bromide, hydrogen chloride or hydrogen fluoride, respectively, in an organic solvent such as carbon tetrachloride or methylene chloride. To prepare compounds of the present invention wherein Z taken with Z' is oxido, the mono-unsaturated precursor is treated with an organic peracid such as perphthalic acid or m-chloroperbenzoic acid in an organic solvent such as ether or tetrahydrofuran. The epoxides (Z taken with Z' is oxido) serve as precursors for the episulfides of the present invention. The episulfides (Z taken with Z' is epithio) are prepared by treating the epoxide precursor with potassium thiocyanate or ammonium thiocyanate in an organic solvent such as a lower alcohol.

The term "halo," as used herein, refers to bromo, chloro, fluoro or iodo. The term "lower alkyl," as used herein, refers to an alkyl group, straight or branched, having a chain length of one to six carbon atoms. The term "cycloalkyl," as used herein, refers to a cycloalkyl of four to eight carbon atoms. The term "aralkyl," as used herein, refers to aralkyl of seven to twelve carbon atoms, such as benzyl, phenethyl, methylbenzyl or naphthylmethyl.

The compounds of Formula I include lower alkyl and lower alkoxy substituted phenyl, i.e. wherein Y is lower alkyl or lower alkoxy, which are exemplified by 4-ethylphenyl,
3-ethylphenyl,
2-ethylphenyl,
3,5-dimethylphenyl,
3,4-dimethylphenyl,
2,6-dimethylphenyl,
2,5-dimethylphenyl,
2,4-dimethylphenyl,
2,3-dimethylphenyl,
2,6-dimethylphenyl diisopropylphenyl,
3,5-di-t-butylphenyl,
2,6-di-sec-butylphenyl,
2,5-di-t-butylphenyl,
2,4-di-t-butylphenyl,
2,6-di-t-butyl-4-methylphenyl,
4-t-butylphenyl,
3-t-butylphenyl,
4-sec-butylphenyl,
2-t-butylphenyl,
2-sec-butylphenyl,
4-t-butyl-2-methylphenyl,
2-t-butyl-6-methylphenyl,
2-t-butyl-5-methylphenyl,
2-t-butyl-4-methylphenyl,
4-t-amylphenyl,
2-isopropylphenyl,
3-isopropylphenyl,
2-n-propylphenyl,
4-n-propylphenyl,
2,3,5,6-tetramethylphenyl,
2,4,6-tri-t-butylphenyl,
2,3,5-trimethylphenyl,
2,3,6-trimethylphenyl,
2,4,6-trimethylphenyl,
3,4,5-trimethylphenyl,
4-isopropylphenyl,
2-methyl-4,6-dinitrophenyl,
2-methyl-4-chlorophenyl,
2-chloro-4-t-butylphenyl,
2-chloro-4,5-dimethylphenyl,
2,6-dimethyl-4-nitrosophenyl,
2,6-dimethyl-4-nitrophenyl,
2,6-dimethyl-4-nitrophenyl,
2,4-dichloro-6-methylphenyl,
2,4-dichloro-5-methylphenyl,
2,6-di-t-butyl-4-nitrosophenyl,
2,6-dibromo-4-methylphenyl,
4-chloro-2,3,6-trimethylphenyl,
4-chloro-3-methylphenyl,
4-chloro-2-methylphenyl,
2-chloro-6-methylphenyl,
4-chloro-3,5-dimethylphenyl,
4-chloro-2,6-dimethylphenyl,
4-chloro-2,5-dimethylphenyl,
2-chloro-4,5-dimethylphenyl,
4-t-butyl-2-chloro-phenyl,
2-bromo-4-methylphenyl,
4-bromo-3,5-dimethylphenyl,
2-bromo-4,5-dimethylphenyl,
2-methyl-3-nitrophenyl,
3-methyl-4-nitrophenyl,
4-methyl-3-nitrophenyl,
5-methyl-2-nitrophenyl,
2-methyl-4-nitrosophenyl,
3-methyl-4-nitrosophenyl and 2-methoxy-4-methylphenyl
and lower alkoxyphenyl, such as
3,5-dimethoxyphenyl,
2,6-dimethoxyphenyl,
2,3-dimethoxyphenyl,
4-n-butoxyphenyl,
4-methoxyphenyl,
4-ethoxyphenyl,
2-ethoxy-4-nitrophenyl,
2-methoxy-4-nitrophenyl,
2-methoxy-4-chlorophenyl and
3-methoxyphenyl.

Examples of other phenyl groups (R) are 4-nitrosophenyl,
2-chloro-4-nitrosophenyl,
2-chloromethyl-4-nitrophenyl,
3-trifluoromethyl-2,4,6-trinitrophenyl,
4-cyanophenyl,
3-cyanophenyl,
2-cyanophenyl,
4-methylthiophenyl,
4-trifluoromethylphenyl,
3-trifluoromethylphenyl,
2,5-dichloro-4-methoxyphenyl,
2,6-dichloro-4-(methylsulfonyl)phenyl,
3,5-dichloro-4-(methylsulfonyl)phenyl and
dichloro-4-methylthiophenyl.

Examples of other phenyl groups (R) of the compounds of the present invention are 2-chloro-4-bromophenyl, 2, 3 or 4-chlorophenyl, 2,3-, 2,4-, 2,5-, 2,6-, 3,4- or 3,5-dichlorophenyl, 2,3,4-, 2,3,6-, 2,3,5-, 2,4,5-, 2,4,6- or 3,4,5-trichlorophenyl, pentachlorophenyl, pentabromophenyl, pentafluorophenyl, 2,3,4,6-tetrachlorophenyl, 2,3,5,6-tetrafluorophenyl, 2,4,6 - tribromophenyl, 2,4,6 - triiodophenyl, 4-bromo-2,6-dichlorophenyl, 4-iodophenyl, 2-, 3- or 4-fluorophenyl, 2-, 3- or 4-bromophenyl and 4-iodophenyl.

The following examples are provided to illustrate the present invention. Temperature is given in degrees centigrade.

EXAMPLE 1

(A) 2,5-dimethylhex-4-en-1-ol (2.6 g.) is dissolved in 40 ml. of ether, cooled to −50° and 2.44 g. of phosphorus tribromide in 5 ml. of ether is added over 20 minutes. The reaction mixture is stirred for two hours, poured onto ice and extracted with ether. The ethereal extracts are combined, washed with 10% sodium carbonate, water and saturated sodium chloride, dried over sodium sulfate and the solvent concentrated to yield 2,5-dimethylhex-4-enyl bromide.

(B) To a suspension of 1 g. of sodium hydride (washed with pentane) in 10 ml. of tetrahydrofuran, under argon, and cooled to 4°, is added 3.38 g. of p-ethylphenol in 15 ml. of tetrahydrofuran over one hour. The reaction mixture is stirred for about 16 hours.

To the above-prepared sodium salt solution of p-ethylphenol, cooled in an ice-bath, is added with ether, the concentrate of the bromide from part (A) over 1.5 hours. After 1.75 hours, the reaction is warmed to room temperature and allowed to stand about 16 hours. The reaction is poured into water and extracted with ether. The ethereal extracts are combined, washed with 10% NaOH, water and saturated sodium chloride, dried over sodium sulfate and solvents evaporated to yield 1-(2′,5′-dimethylhex-4′-enyloxy)-4-ethylbenzene(2,5-dimethylhex-4-enyl p-ethylphenyl ether).

(C) The procedure of part (A) is repeated with the exception of using an equal amount of the C–1 alcohols listed in column (I) to afford the corresponding C–1 bromide listed in column (II).

(I)

2,5-dimethylhept-4-en-1-ol,
2-methyl-5-ethylhept-4-en-1-ol,
2,5-diethylhept-4-en-1-ol,
2,5-dimethyloct-4-en-1-ol,
3,6-dimethylhept-5-en-1-ol,
3,6-dimethyloct-5-en-1-ol, 3-methyl-6-ethyloct-5-en-1-ol,
3,6-diethyloct-5-en-1-ol,
3,6-dimethylnon-5-en-1-ol.

(II)

2,5-dimethylhept-4-enyl bromide,
2-methyl-5-ethylhept-4-enyl bromide,
2,5-diethylhept-4-enyl bromide,
2,5-dimethyloct-4-enyl bromide,
3,6-dimethylhept-5-enyl bromide,
3,6-dimethyloct-5-enyl bromide,
3,6-dimethylnon-5-enyl bromide.

The C-1 chlorides are prepared in the same way using phosphorus trichloride in place of phosphorus tribromide.

Following the procedure of part (B), each of the bromides under column (II) is reacted with p-ethylphenol to prepare the p-ethylphenyl ethers under column (III).

(III)

2,5-dimethylhept-4-enyl p-ethylphenyl ether,
2-methyl-5-ethylhept-4-enyl p-ethylphenyl ether,
2,5-diethylhept-4-enyl p-ethylphenyl ether,
2,5-dimethyloct-4-enyl p-ethylphenyl ether,
3,6-dimethylhept-5-enyl p-ethylphenyl ether,
3,6-dimethyloct-5-enyl p-ethylphenyl ether,
3-methyl-6-ethyloct-5-enyl p-ethylphenyl ether,
3,6-diethyloct-5-enyl p-ethylphenyl ether,
3,6-dimethylnon-5-enyl p-ethylphenyl ether.

EXAMPLE 2

A mixture of one g. of potassium carbonate, 0.4 g. of p-isopropylphenol and 20 ml. of dry dimethylformamide is stirred for about 30 minutes at room temperature under nitrogen. The mixture is cooled (0°) and then 0.5 g. of 2,5 - dimethylhept - 4 - enyl bromide in 20 ml. of dimethylformamide is added slowly. The reaction mixture is then left overnight at room temperature. The mixture is then washed with 2 N sodium hydroxide and saturated sodium chloride solution. The crude product is chromatographed to yield 2,5-dimethylhept-4-enyl p-isopropylphenyl ether.

EXAMPLE 3

A mixture of 0.4 g. of sesamol, 0.4 g. of potassium carbonate, 0.55 g. of 3,6-dimethylhept-5-enyl bromide and 20 ml. of acetone, under nitrogen, is stirred for about 16 hours. The mixture is then poured into water and extracted with ether. The ethereal extract is washed with cold 2 N sodium hydroxide, water and brine, dried over sodium sulfate and evaporated to yield 3,6-dimethylhept-5-enyl 3,4-methylenedioxyphenyl ether which can be purified by chromatography.

EXAMPLE 4

Following the procedure of Example 1(A), each of the alcohols under column (III) is converted into the bromide under column (IV).

(III)

2,5-dimethylhexan-1-ol,
2,5-dimethylheptan-1-ol,
2-methyl-5-ethylheptan-1-ol,
2,5-diethylheptan-1-ol,
2,5-dimethyloctan-1-ol,
3,6-dimethylheptan-1-ol,
3,6-dimethyloctan-1-ol,
3-methyl-6-ethyloctan-1-ol,
3,6-diethyloctan-1-ol,
3,6-dimethylnonan-1-ol.

(IV)

2,5-dimethylhexyl bromide,
2,5-dimethylheptyl bromide,
2-methyl-5-ethylheptyl bromide,
2,5-diethylheptyl bromide,
2,5-dimethyloctyl bromide,
3,6-dimethylheptyl bromide,
3,6-dimethyloctyl bromide,
3-methyl-6-ethyloctyl bromide,
3,6-diethyloctyl bromide,
3,6-dimethylnonyl bromide, Following the process of Example 1(B) or 2, p-ethylphenol is alkylated using the bromides under column (IV) to prepare the respective p-ethylphenyl ether under column (V).

(V)

2,5-dimethylhexyl p-ethylphenyl ether,
2,5-dimethylheptyl p-ethylphenyl ether,
2-methyl-5-ethylheptyl p-ethylphenyl ether,
2,5-diethylheptyl p-ethylphenyl ether,
2,5-dimethyloctyl p-ethylphenyl ether,
3,6-dimethylheptyl p-ethylphenyl ether,
3,6-dimethyloctyl p-ethylphenyl ether,
3-methyl-6-ethyloctyl p-ethylphenyl ether,
3,6-diethyloctyl p-ethylphenyl ether,
3,6-dimethylnonyl p-ethylphenyl ether.

Following the process of Example 3, sesamol is alkylated using each of the bromides under column (IV) to prepare the respective sesamol ether—e.g., 2,5-dimethylhexyl 3,4-methylenedioxyphenyl ether,
3,6-dimethylheptyl 3,4-methylenedioxyphenyl ether,
3,6-dimethyloctyl 3,4-methylenedioxyphenyl ether, etc.

Similarly, using each of the bromides under column (II) in the process of Example 3, the respectve sesamol ethers are prepared, e.g., 2,-dimethylhex-4-enyl 3,4-methylenedioxyphenyl ether,
2,5-dimethylhept-4-enyl 3,4-methylenedioxyphenyl ether, etc.

By using piperonol in the process of Example 3 in place of sesamol, there is prepared 3,6-dimethylhept-5-enyl 3,4-methylenedioxybenzyl ether. Similarly, piperonol is alkylated using each of the bromides under columns (II) and (IV) to prepare the respective piperonyl ether, e.g., 2,5 - dimethylhex-4-enyl 3,4-methylenedioxybenzyl ether, 2,5-dimethylhept-4-enyl 3,4-methylenedioxybenzyl ether, 2,5-dimethylhexyl 3,4-methylenedioxybenzyl ether, 2,5-dimethylheptyl 3,4-methylenedioxybenzyl ether, etc.

By using p-ethylbenzyl alcohol in place of the p-alkylphenol in the process of Example 1(B) or 2, the respective p-ethylbenzyl ether is prepared, i.e., 2,5-dimethylhex-4-nyl p-ethylbenzyl ether and 2,5-dimethylhept-4-enyl p-ethylbenzyl ether. Similarly, using each of the other bromides under columns (II) and (IV) as the alkylating agent, the respective p-ethylbenzyl ethers are prepared, e.g., 2-methyl-5-ethylhept-4-enyl p-ethylbenzyl ether, 2,5-diethylhept-4-enyl p-ethylbenzyl ether, 2,5-dimethylhexyl p-ethylbenzyl ether, 2,5 - dimethylheptyl p-ethylbenzyl ether, etc.

EXAMPLE 5

(A) Each of p-nitrophenol, p-chlorophenol, 2,3,4-trichlorophenol, 3-ethylphenol, p-t-butylphenol, p-trifluoromethylphenol, p-ethoxyphenol, 3-ethyl-4-chlorophenol, 2-methyl-4-ethylphenol, 2-chloro-4-t-butylphenol, 2-chloro-4,5-dimethylphenol, p-allylphenol, p-(1'-propenyl)phenol, p-sec. butylphenol, 3,4-methylenedioxphenol, 3-chloro-4-ethylphenol, 2,4,6-trichlorophenol, 3,4-dichlorophenol, 2,4-dichlorophenol, 2,4,5-trichlorophenol, 2,3,4,6-tetrachlorophenol, p-methylphenol and p-isopropylphenol is alkylated using 2,5-dimethylhex-4-enyl bromide according to the process of Ex. 1(B) or 2 to prepare the respective ether under column (VI) i.e., (VI)

2,5-dimethylhex-4-enyl p-nitrophenyl ether,
2,5-dimethylhex-4-enyl p-chlorophenyl ether,
2,5-dimethylhex-4-enyl 2,3,4-trichlorophenyl ether 2,5-dimethylhex-4-enyl 3-ethylphenyl ether,
2,5-dimethylhex-4-enyl p-t-butylphenyl ether,
2,5-dimethylhex-4-enyl p-trifluoromethylphenyl ether, 2,5-dimethylhex-4-enyl p-ethoxyphenyl ether,
2,5-dimethylhex-4-enyl 3-ethyl-4-chlorophenyl ether,
2,5-dimethylhex-4-enyl 2-methyl-4-ethylphenyl ether,
2,5-dimethylhex-4-enyl 2-chloro-4-t-butylphenyl ether,
2,5-dimethylhex-4-enyl 2-chloro-4,5-dimethylphenyl ether,
2,5-dimethylhex-4-enyl p-allylphenyl ether,
2,5-dimethylhex-4-enyl p-(1'-propenyl)phenyl ether,
2,5-dimethylhex-4-enyl p-sec. butylphenyl ether,
2,5-dimethylhex-4-enyl 3,4-methylenedioxyphenyl ether,
2,5-dimethylhex-4-enyl 3-chloro-4-ethylphenyl ether,
2,5-dimethylhex-4-enyl 2,4,6-trichlorophenyl ether,
2,5-dimethylhex-4-enyl 3,4-dichlorophenyl ether,
2,5-dimethylhex-4-enyl 2,4-dichlorophenyl ether,
2,5-dimethylhex-4-enyl 2,4,5-trichlorophenyl ether,
2,5-dimethylhex-4-enyl 2,3,4,6-tetrachlorophenyl ether,
2,5-dimethylhex-4-enyl p-methylphenyl ether,
2,5-dimethylhex-4-enyl p-isopropylphenyl ether.

In the same way, each of the bromides under column (II) is used as the alkylating agent in the procedure of Example 1(B) or 2 with the phenols of part (A) of this example to prepare the respective substituted phenyl ethers of Formula I, e.g., 2,5-dimethylhept-4-enyl p-nitrophenyl ether, 2,5-dimethylhept-4-enyl p-chlorophenyl ether, 2,5-dimethyl-4-enyl 2,3,4-trichlorophenyl ether, etc.

(B) By use of the process of either Example 1(B) or 2, each of the phenols of part (A) of this example is alkylated using each of the bromides under column (IV) to prepare the respective substituted phenyl ether, for example, 2,5-dimethylhexyl p-nitrophenyl ether,
2,5-dimethylhexyl p-chlorophenyl ether,
2,5-dimethylhexyl 2,3,4-trichlorophenyl ether,
2,5-dimethylhexyl 3-ethylphenyl ether,
2,5-dimethylhexyl p-t-butylphenyl ether,
2,5-dimethylhexyl p-trifluoromethylphenyl ether,
2,5-dimethylhexyl p-ethoxyphenyl ether,
2,5-dimethylhexyl 3-ethyl-4-chlorophenyl ether,
2,5-dimethylhexyl 2-methyl-4-ethylphenyl ether,
2,5-dimethylhexyl 2-chloro-4-t-butylphenyl ether,
2,5-dimethylhexyl 2-chloro-4,5-dimethylphenyl ether,
2,5-dimethylhexyl p-allylphenyl ether,
2,5-dimethylhexyl p-(1'-propenyl)phenyl ether,
2,5-dimethylhexyl p-sec. butylphenyl ether,
2,5-dimethylhexyl 3,4-methylenedioxyphenyl ether,
2,5-dimethylhexyl 3-chloro-4-ethylphenyl ether,
2,5-dimethylhexyl 2,4,6-trichlorophenyl ether,
2,5-dimethylhexyl 3,4-dichlorophenyl ether,
2,5-dimethylhexyl 2,4-dichlorophenyl ether,
2,5-dimethylhexyl 2,4,5-trichlorophenyl ether,
2,5-dimethylhexyl 2,3,4,6-tetrachlorophenyl ether,
2,5-dimethylhexyl p-methylphenyl ether,
2,5-dimethylhexyl p-isopropylphenyl ether,
2,5-dimethylheptyl p-nitrophenyl ether,
2,5-dimethylheptyl p-chlorophenyl ether, etc.

EXAMPLE 6

To a solution of 1 g. of 3,6-dimethylhept-5-enyl 3,4-methylenedioxyphenyl ether and 20 ml. of methylene chloride, cooled to ice temperature, is added 0.4 g. of m-chloroperbenzoic acid in methylene chloride. After about 30 minutes, the reaction mixture is filtered into 10% sodium sulfite, washed with saturated sodium bicarbonate and dried over sodium sulfate. The crude product is chromatographed to yield 5,6-oxido-3,6-dimethylheptyl 3,4-methylenedioxyphenyl ether.

EXAMPLE 7

To a solution of 0.25 g. of 3,6-diethyloct-5-enyl p-isopropylphenyl ether and 15 ml. of methylene chloride is slowly added 0.2 g. of m-chloroperbenzoic acid (85%) at ice temperature. The reaction mixture is then stirred for about three hours at ice temperature. The mixture is then washed with 10% sodium sulfite, saturated sodium bicarbonate, and then water, dried over magnesium sulfate and evaporated to yield 5,6-oxido-3,6-diethyloctyl p-isopropylphenyl ether which is purified by chromatography.

EXAMPLE 8

By use of the process of Example 6 or 7, each of the mono-unsaturated ethers of Examples 1, 2, 4 and 5 is epoxidized to prepare the respective epoxide of Formula I, e.g., 4,5-oxido-2,5-dimethylhexyl p-ethylphenyl ether,
4,5-oxido-2,5-dimethylheptyl p-ethylphenyl ether,
4,5-oxido-2-methyl-5-ethylheptyl p-ethylphenyl ether,
4,5-oxido-2,5-dimethyloctyl p-ethylphenyl ether,
5,6-oxido-3,6-dimethylheptyl p-ethylphenyl ether,
5,6-oxido-3,6-dimethyloctyl p-ethylphenyl ether,
5,6-oxido-3-methyl-6-ethyloctyl p-ethylphenyl ether,
5,6-oxido-3,6-diethyloctyl p-ethylphenyl ether,
5,6-oxido-3,6-dimethylnonyl p-ethylphenyl ether,
4,5-oxido-2,5-dimethylheptyl p-isopropylphenyl ether,
4,5-oxido-2,5-dimethylhexyl 3,4-methylenedioxyphenyl ether,
4,5-oxido-2,5-dimethylheptyl 3,4-methylenedioxyphenyl ether,
4,5-oxido-2,5-dimethylhexyl 3,4-methylenedioxyphenyl ether,
4,5-oxido-2,5-dimethylheptyl 3,4-methylenedioxyphenyl ether,
4,5-oxido-2,5-dimethylhexyl p-ethylbenzyl ether,
4,5-oxido-2,5-dimethylheptyl p-ethylbenzyl ether,
4,5-oxido-2-methyl-5-ethylheptyl p-ethylbenzyl ether,
4,5-oxido-2,5-diethylheptyl p-ethylbenzyl ether, and the respective 4,5-epoxide of each of the ethers of Example 5(A) as well as the corresponding 5,6-epoxide of the 5,6-unsaturated ethers of Formula I.

EXAMPLE 9

(A) Following the process of Example 6 or 7, 2,5-dimethylhex-4-enyl bromide is reacted with m-chloroperbenzoic acid to prepare 4,5-oxido-2,5-dimethylhexyl bromide. In the same way, each of the bromides or chlorides of Formula V (wherein Z taken with Z' is a carbon-carbon bond), such as those under column (II), is converted into the respective 4,5-epoxide or 5,6-epoxide depending upon the position of the double bond.

(B) Following the process of Example 1(B) or 2, 4,5-oxido-2,5-dimethylhexyl bromide is reacted with each of 4-methylsulfonylphenol, 2,4-dimethylthiophenol, 4-ethylthiophenol, 4-methylthio-3-ethylphenol, 4-methylthio-3,5-dimethylphenol, 4-methylthiomethylphenol, 2-allyl-4-clorophenol, 4-s-butenylphenol, 4-(1-propenyl)phenol, 4-allylphenol, 4-cyanophenol, 2-allyl-3,5-dichlorophenol, 4-methylthiophenol and 2-allyl-6-methoxyphenol to prepare the respective ether, i.e., 4,5-oxido-2,5-dimethyhexyl 4-methylsulfonylphenyl ether,
4,5-oxido-2,5-dimethylhexyl 2,4-dimethylthiophenyl ether,
4,5-oxido-2,5-dimethylhexyl 4-ethylthiophenyl ether,
4,5-oxido-2,5-dimethylhexyl 4-methylthio-3-ethylphenyl ether,
4,5-oxido-2,5-dimethylhexyl 4-methylene-3,5-dimethylphenyl ether,
4,5-oxido-2,5-dimethylhexyl 4-methylthiomethylphenyl ether,
4,5-oxido-2,5-dimethylhexyl 2-allyl-4-chlorophenyl ether,
4,5-oxido-2,5-dimethylhexyl 4-s-butylphenyl ether, 4,5-oxido-2,5-dimethylhexyl 4-(1-propenyl)phenyl ether,
4,5-oxido-2,5-dimethylhexyl 4-allylphenyl ether,
4,5-oxido-2,5-dimethylhexyl 4-cyanophenyl ether,
4,5-oxido-2,5-dimethylhexyl 2-allyl-3,5-dichlorophenyl ether,
4,5-oxido-2,5-dimethylhexyl 4-methylthiophenyl ether,
4,5-oxido-2,5-dimethylhexyl 2-allyl-6-methoxyphenyl ether.

Similarly, following the procedure of Example 1(B) or 2, each of the bromides under columns (II) and (IV) is used as the alkylating agent with each of the substituted phenols of this example to prepare the respective substituted phenyl ether, e.g.

2,5-dimethylhept-4-enyl 4-methylsulfonylphenyl ether,
3,6-dimethylhept-5-enyl 4-methylsulfonylphenyl ether,
3,6-dimethylhept-5-enyl 4-methylthiophenyl ether,
3,6-dimethylheptyl 4-methylthiophenyl ether,
3,6-dimethylheptyl 4-allylphenyl ether, etc.

EXAMPLE 10

To a solution of 2.1 g. of sodium in 50 ml. of methanol at 0° is added 14 g. of p-ethylphenyl mercaptan. After about 0.5 hour, 20 g. of 3,6-dimethylheptyl bromide is added and then the reaction mixture is refluxed for about 2.5 hours. The solvent is evaporated and the concentrate taken up in petroleum ether which is washed with water, dried over magnesium sulfate and evaporated under reduced pressure to yield 3,6-dimethylheptyl p-ethylphenyl sulfide.

By use of the foregoing process, each of the bromides under columns (II) and (IV), as well as the oxido-substituted bromides of Example 9 is reacted with p-ethylphenyl mercaptan to prepare the respective thio-ether, e.g. 2,5-dimethylhept-4-enyl p-ethylphenyl sulfide, 2,5-dimethylhexyl p-ethylphenyl sulfide, 4,5-oxido-2,5-dimethylhexyl p-ethylphenyl sulfide, etc.

EXAMPLE 11

To 210 ml. of a 0.5 M solution of sodium meta-periodate (aqueous methanol 1/1) at 0° is added 0.1 mole of 3,6-dimethylheptyl p-ethylphenyl sulfide. The mixture is stirred at 0° for about four hours and then filtered to remove precipitated sodium iodate. The filtrate is diluted with water and then extracted with chloroform. The extract is dried over magnesium sulfate and solvent removed by evaporation under reduced pressure to yield 3,6-dimethylheptyl p-ethylphenyl sulfoxide which can be purified by chromatography.

EXAMPLE 12

To 200 ml. of aqueous methanol (1/1) containing 0.2 mole of sodium metaperiodate is added 0.1 mole of 3,6-dimethylheptyl p-ethylphenyl sulfide. The mixture is maintained at about 30° for six hours. After cooling, the mixture is filtered to remove precipitated sodium iodate. The filtrate is diluted with water and then extracted with chloroform. The extract is dried over magnesium sulfate and solvent removed by evaporation to yield 3,6-dimethylheptyl p-ethylphenylsulfone which can be purified by chromatography.

EXAMPLE 13

Three grams of methyl p-hydroxybenzoate and 4 g. of 3,6-dimethyloct-5-enyl bromide are added at 20° to methanolic sodium methoxide (0.5 g. of sodium and 7 ml. of methanol) and the mixture refluxed for four hours. After cooling to about 20°, the sodium bromide is filtered off and the filtrate concentrated. The concentrate is diluted with water and then extracted with ether. The ethereal extracts are combined, dried over sodium sulfate and evaporated under reduced pressure to yield methyl 4-(3,6-dimethyloct-5-enyloxy)benzoate which can be purified by chromatography on silica.

EXAMPLE 14

To 0.6 g. of 5,6-oxido-3,6-dimethylheptyl p-ethylphenyl ether in 30 ml. of absolute ethanol is added 5.2 ml. of water and 1.1 g. of potassium thiocyanate. The mixture is heated at reflux for about 50 hours. The mixture is then poured into brine and extracted with ether. The extract is washed with brine, dried and solvent evaporated to yield 5,6-epithio-3,6-dimethylheptyl p-ethylphenyl ether which can be purified by chromatography.

By use of the process of this example, other epoxides of Formula I are treated with potassium thiocyanate or ammonium thiocyanate to prepare the respective episulfide of Formula I such as:

5,6-epithio-3,6-dimethylheptyl 3,4-methylenedioxyphenyl ether,
5,6-epithio-3,6-diethyloctyl p-isopropylphenyl ether,
4,5-epithio-2,5-dimethylhexyl p-ethylphenyl ether,
4,5-epithio-2,5-dimethylheptyl p-ethylphenyl ether,
4,5-epithio-2,5-dimethylhexyl 3,4-methylenedioxyphenyl ether,
4,5-epithio-2,5-dimethylhexyl p-ethylbenzyl ether,
5,6-epithio-3,6-dimethylheptyl p-ethylphenyl ether,
5,6-epithio-3-methyl-6-ethyloctyl p-ethylphenyl ether,
4,5-epithio-2,5-dimethylhexyl 4-methylsulfonylphenyl ether,
4,5-epithio-2,5-dimethylhexyl 4-methylthiophenyl ether,
4,5-epithio-2,5-dimethylhexyl 4-ethylthiophenyl ether,
4,5-epithio-2,5-dimethylhexyl 4-ethoxyphenyl ether,
4,5-epithio-2,5-dimethylhexyl 4-allylphenyl ether,
4,5-epithio-2,5-dimethylhexyl 4-chlorophenyl ether, etc.

EXAMPLE 15

Anhydrous hydrogen chloride is bubbled into 100 ml. of dry carbon tetrachloride at 0° until one equivalent is taken up. Five grams of 3,6-dimethylhept-5-enyl p-ethylphenyl ether is added and the resulting mixture allowed to stand for about 48 hours at 0°. The mixture is evaporated under reduced pressure to yield 6-chloro-3,6-dimethylheptyl p-ethylphenyl ether which is purified by chromatography.

By repeating the process of this example using as the starting material other unsaturated (Z taken with Z' is a carbon-carbon bond) compounds of Formula I, the respective chloride (Z is chloro, Z' is hydrogen) of Formula I is prepared, e.g., 6-chloro-3,6-dimethylheptyl 3,4-methylenedioxyphenyl ether,
6-chloro-3,6-dimethyloctyl p-isopropylphenyl ether,
5-chloro-2,5-dimethylhexyl p-ethylphenyl ether,
5-chloro-2,5-dimethylheptyl p-ethylphenyl ether,
5-chloro-2,5-dimethylheptyl p-ethylphenyl sulfide,
5-chloro-2,5-dimethylheptyl p-ethylpenyl sulfone,
5-cloro-2,5-dimethylhexyl 3,4-methylenedioxyphenyl ether,
5-chloro-2,5-dimethylhexyl p-ethylbenzyl ether,
5-chloro-2,5-dimethylhexyl 3,4-methylenedioxybenzyl ether,
6-chloro-3-methyl-6-ethyloctyl p-ethylphenyl ether,
5-chloro-2,5-dimethylhexyl 4-methylsulfonyl ether,
5-chloro-2,5-dimethylhexyl 4-ethylthiophenyl ether,
5-chloro-2,5-dimethylhexyl 4-methylthiophenyl ether,
5-chloro-2,5-dimethylhexyl 4-chlorophenyl ether,
5-chloro-2,5-dimethylhexyl 4-ethoxyphenyl ether, etc.

By using hydrogen bromide in place of hydrogen chloride in the process of this example, the respective bromides are prepared, e.g., 6-bromo-3,6-dimethylheptyl p-ethylphenyl ether.

EXAMPLE 16

One gram of 3,6-dimethylhept-5-enyl p-ethylphenyl ether is added to a solution of one equivalent of dry hydrogen fluoride in dry tetrahydrofuran. The mixture is allowed to stand for 0° for 15 hours and is then washed

11 with water, dried over magnesium sulfate and evaporated under reduced pressure to yield 6-fluoro-3,6-dimethylheptyl p-ethylphenyl ether which can be purified by chromatography.

EXAMPLE 17

The precursors for preparation of the compounds of Formula I are prepared according to the following outlined synthesis.

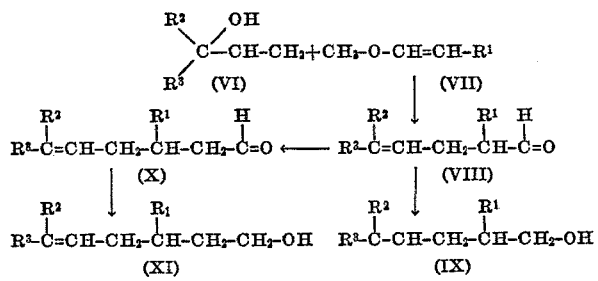

In the practice of the above outlined synthesis, an aldehyde of Formula VIII is prepared by the acid-catalyzed reaction of an allylic alcohol of Formula VI with an enol ether of Formula VII. An aldehyde of Formula VIII is then reduced using sodium borohydride to prepare the C-1 alcohol of Formula IX. An aldehyde of Formula X is prepared by ylid reaction using methoxymethyltriphenylphosphonium chloride and phenyl lithium on the aldehyde VIII. The alcohol of Formula XI is then prepared by reduction with sodium borohydride.

(A) A mixture of 44 g. of 3-methylbut-1-en-1-ol, 75 g. of 1-methoxyprop-1-ene and 0.26 g. of phosphoric acid is heated in a pressure vessel, under nitrogen, at about 140° for about one hour or until substantially all of the allylic alcohol is consumed as followed by chromatography. The mixture is allowed to cool and then about 1.5 ml. of triethylamine is added. The mixture is then distilled under vacuum to yield 2,5-dimethylhex-4-en-1-al.

(B) Five g. of 2,5-dimethylhex-4-en-1-al is added to a mixture of 2.2 g. of sodium borohydride, 100 ml. of methanol and 4 ml. of 2 N sodium hydroxide and the resulting mixture allowed to stand at room temperature for about three hours. The mixture is then poured into water and extracted with methylene chloride. The extracts are combined, washed, dried over magnesium sulfate and solvent evaporated to yield 2,5-dimethylhex-4-en-1-ol which can be purified by distillation.

(C) To a suspension of 21 grams of methoxymethyltriphenylphosphonium chloride in 200 ml. of absolute ether is added under nitrogen at room temperature a solution of 60 mmoles of phenyllithium in ether. After about 10 minutes, the mixture is cooled to —30° and 6 grams of 2,5-dimethylhex-4-en-1-al in ether is added slowly. After about 15 hours at room temperature, the mixture is filtered and the filtrate evaporated to yield the methoxymethylene of 2,5-dimethylhex-4-en-al which is dissolved in aqueous tetrahydrofuran containing a small amount of dilute hydrochloric acid to yield 3,6-dimethylhept-5-en-1-al which is reduced using the process of part (B) to yield 3,6-dimethylhept-5-en-1-ol.

(D) The process of part (A) is repeated using each of 3-methylpent-1-en-3-ol, 3-ethylpent-1-en-3-ol and 3-methylhex-1-en-3-ol as the allylic alcohol to prepare 2,5-dimethylhept-4-en-1-al, 2-methyl-5-ethylhept-4-en-1-al and 2,5-dimethyloct-4-en-1-al, respectively. Using the process of part (B), each of the aldehydes is reduced to the respective C-1 alcohol.

By repeating the process of part (C) using each of the thus-prepared aldehydes as the starting material, there is prepared 3,6-dimethyloct-5-en-1-al, 3-methyl-6-ethyloct-5-en-1-al and 3,6-dimethylnon-5-en-1-al. The respective alcohols are prepared by the process of part (B).

12

(E) A mixture of 15 g. of 2,5-dimethylhex-4-en-1-al, 3 g. of 5% palladium-on-carbon and 100 ml. of ethanol under excess hydrogen at one atmosphere pressure and at room temperature is stirred for about 48 hours. Then a few milliliters (about 5 ml.) of dichloromethane is added and the mixture filtered through Celite. The filtrate is concentrated under reduced pressure to yield 2,5-dimethylhexan-1-al which is purified by chromatography.

The thus-prepared saturated aldehyde is reduced using the process of part (B) to prepare 2,5-dimethylhexan-1-ol.

By use of the foregoing process, each of the saturated alcohols under column (III) is prepared. Alternatively, the unsaturated alcohols of parts (B) and (C) can be hydrogenated to prepare the respective saturated alcohol.

What is claimed is:

1. A compound selected from those of the following Formula I:

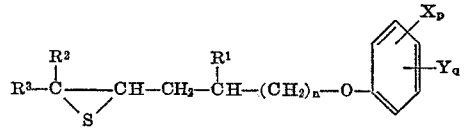

wherein, $n$ is the positive integer one or two;
each of $R^1$, $R^2$ and $R^3$ is methyl or ethyl;
X is halo; Y is lower alkyl, lower alkenyl, lower alkoxy, lower alkylthio, or lower alkylsulfonyl; $p$ is zero or a positive integer of one to five; and $q$ is zero or a positive integer of one to three, the sum of $p$ and $q$ being from one to five.

2. A compound according to claim 1 wherein $q$ is zero; X is chloro; and $p$ is one to three.

3. A compound according to claim 1 wherein $p$ is zero; Y is lower alkyl of one to four carbon atoms; and $q$ is one.

4. A compound according to claim 1 wherein X is chloro; Y is lower alkyl of one to four carbon atoms; $q$ is one; $p$ is one; X is in position 3; and Y is in the para position.

5. A compound according to claim 1 wherein X is chloro; Y is lower alkyl of one to four carbon atoms; $p$ is one; $q$ is one; X is in the para position; and Y is in position 3.

6. The compound, 4,5-epithio-2,5-dimethylhexyl p-ethylphenyl ether, according to claim 1.

7. The compound, 5,6-epithio - 3,6 - dimethylheptyl p-ethylphenyl ether, according to claim 1.

8. The compound, 4,5-epithio - 2,5 - dimethylhexyl p-allylphenyl ether, according to claim 1.

9. A compound according to claim 2 wherein $p$ is one and X is in the para position.

10. The compound, 4,5-epithio - 2,5 - dimethylhexyl p-methylthiophenyl ether, according to claim 1.

References Cited

UNITED STATES PATENTS

| | | | |
|---|---|---|---|
| 3,542,873 | 11/1970 | Faith | 260—570.7 |
| 3,437,691 | 4/1969 | Faith | 260—564 |
| 3,392,145 | 7/1968 | Garty | 260—47 |
| 3,622,597 | 11/1971 | Fletcher et al. | 260—327 |

HENRY R. JILES, Primary Examiner

C. M. S. JAISLE, Assistant Examiner

U.S. Cl. X.R.

260—340.5, 348 R, 348 A, 465 D, 465 F, 465 G, 465 K, 465 R, 470, 473 R, 473 S, 590, 591, 592, 599, 600, 607 A, 609 R, 612 D, 613 D, 618 D, 618 R, 652 R, 653; 424—275, 278, 282, 304, 308, 331, 333, 337, 341